UNITED STATES PATENT OFFICE.

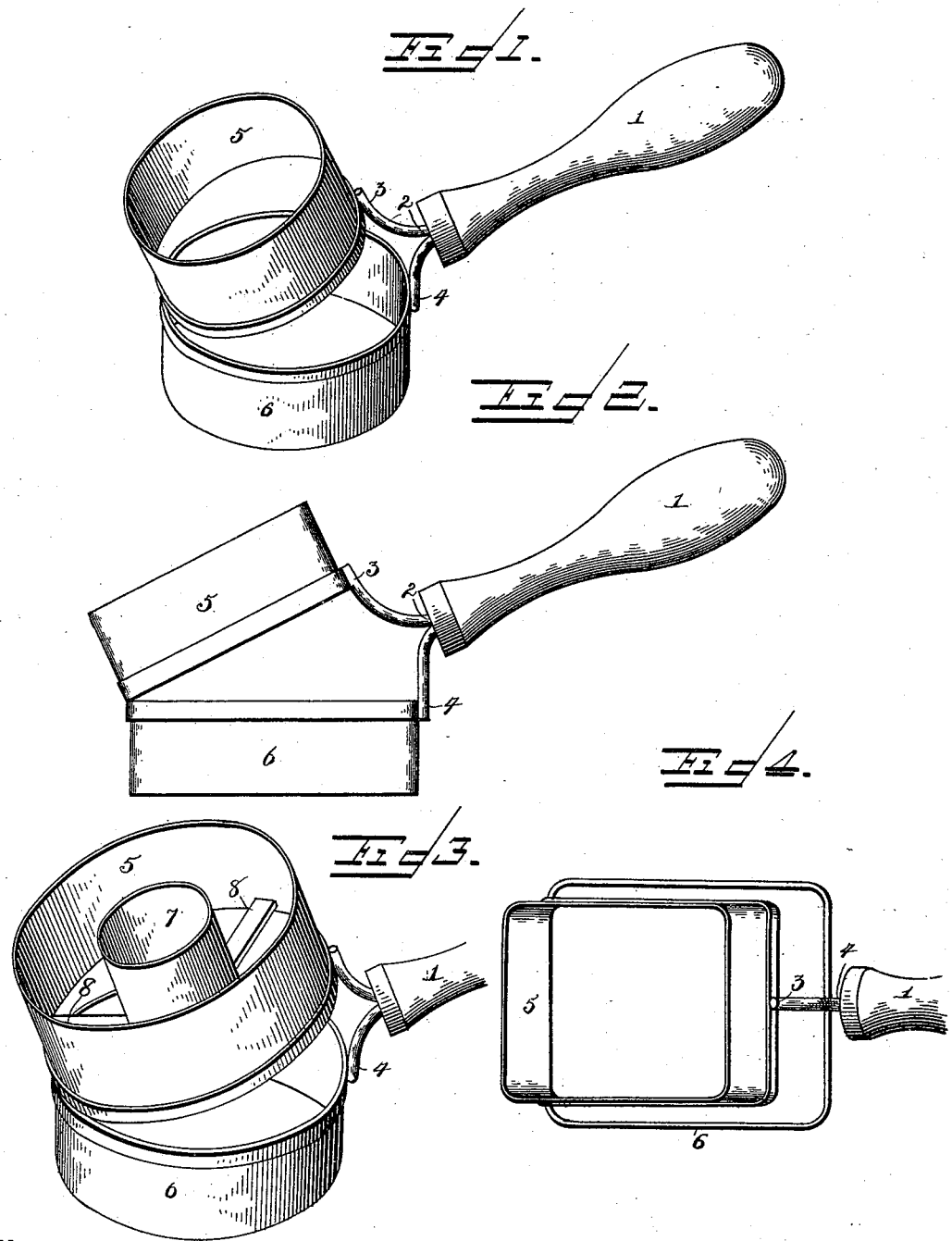

URIAH D. SELTZER, OF LEBANON, PENNSYLVANIA.

CAKE-CUTTER.

SPECIFICATION forming part of Letters Patent No. 499,149, dated June 6, 1893.

Application filed February 23, 1893. Serial No. 463,376. (No model.)

*To all whom it may concern:*

Be it known that I, URIAH D. SELTZER, a citizen of the United States, residing at Lebanon, in the county of Lebanon and State of Pennsylvania, have invented a new and useful Improvement in Cake-Cutters, of which the following is a specification.

This invention relates to cake cutters, and has for its object to simplify the form of such devices and construct them in such manner that they may be easily cleaned and manipulated, the handle being so positioned as to avoid obstructing the view of the work.

With these and other ends in view, the invention consists of the construction and arrangement of the parts thereof as will be more fully hereinafter described and claimed.

In the drawings: Figure 1 is a perspective view of a double form of cake cutter embodying the invention and shown circular in contour. Fig. 2 is a side elevation of a double form of cutter embodying the invention. Fig. 3 is a perspective view of a double form of the cutter showing a center cutter concentrically arranged in one of the double cutters. Fig. 4 is a top plan view of the form of the device shown by Fig. 2.

Similar numerals of reference indicate corresponding parts in the several figures of the drawings.

Referring to the drawings, the numeral 1 designates a handle, preferably of wood, and of suitable size and shape. In one end of the said handle is removably or permanently mounted the handle or stem 2 of double cutters, from which extend angularly-disposed supporting-arms 3 and 4, connected to the inner rims of two cutters 5 and 6, that are preferably made of varying diametrical extent to form one smaller than the other, so that the work being performed by each may be clearly seen when either one or the other of the same is on top. The two cutters are convergingly arranged toward their outer parts and secured to each other so as to make them diverge at their inner portions at the points where the arms 3 and 4 are secured. The angles of the cutters 5 and 6, relatively to the handle 1, are such that when the said handle is properly held within the hand the cutting edge of each cutter when brought to the lower horizontal will rest firmly at all points to make a true cut, and either of the cutters may be used by reversing the same, arising from a rotation of the handle within the hand. In Figs. 2 and 4 a similar arrangement of cutters is shown, but in this instance they are in the form of a rectangle, so as to provide for cutting cakes or other articles in rectangular outline. In Fig. 3 one of the cutters is shown supplied with a concentrically-arranged central cutter 7, supported by a series of radial arms 8, and by means of which cakes that are to have their centers removed may be readily cut, and this form of the device is especially useful in making what is known as doughnuts. In this form of the device, also, the radial arms 8 have their outer ends secured to the inner rim of the cutter, while the lower or opposite end of said central cutter is left clear to perform its requisite cutting operation.

It will be observed that in all the forms the cutters are attached to the handle in such manner that the outer part of each will stand upwardly, or at an oblique angle, when the handle is held in a true horizontal plane; and in order to properly bring the cutting edge or edges of the cutter or cutters firmly to bear at all points on the dough or material to be operated upon the handle is held in the hand at a slightly upward oblique angle or that which would be naturally assumed by the operator. The construction and arrangement of the device as set forth produces a concentration of the pressure that is exerted through the handle and the supporting-arm into the cutter being operated, and the cutter is in such condition that the progress of the work may be conveniently observed by the operator, and all the cutters may be quickly and readily cleansed after using the same.

It is obviously apparent that other changes in the form, proportion, and the minor details of construction may be resorted to without departing from the principle or sacrificing any of the advantages of this invention.

Having described the invention, what is claimed as new is—

1. As an improved article of manufacture, cake-cutters supported by a handle, and converged toward each other, and connected at their outer portions and diverged at their inner portions, said cutters being attached at their inner portions to angularly-disposed arms connected to said handle, substantially as described.

2. As an improved article of manufacture, cutters having the outer parts of the same converged toward each other, and the inner parts diverged and connected to a handle by angularly-disposed supporting arms, one of said cutters being smaller than the other, substantially as described.

3. As an improved article of manufacture, cutters having the outer parts of the same converged toward each other, and the inner parts diverged and connected to a handle by supporting-arms, one of said cutters having a smaller cutter concentrically arranged therein, substantially as described.

In testimony that I claim the foregoing as my own I have hereto affixed my signature in the presence of two witnesses.

URIAH D. SELTZER.

Witnesses:
EPHRAIM L. BLEISTEIN,
ALVIN P. SELTZER.